(12) United States Patent
Hashimoto et al.

(10) Patent No.: US 10,466,701 B2
(45) Date of Patent: Nov. 5, 2019

(54) AUTONOMOUS DRIVING SYSTEM

(71) Applicant: Toyota Jidosha Kabushiki Kaisha, Toyota-shi Aichi-ken (JP)

(72) Inventors: Ryuta Hashimoto, Susono (JP); Yoshinori Watanabe, Isehara (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 115 days.

(21) Appl. No.: 15/819,645

(22) Filed: Nov. 21, 2017

(65) Prior Publication Data

US 2018/0157257 A1    Jun. 7, 2018

(30) Foreign Application Priority Data

Dec. 6, 2016   (JP) .................................. 2016-236913

(51) Int. Cl.
*G05D 1/00* (2006.01)
*B62D 15/02* (2006.01)

(52) U.S. Cl.
CPC ....... *G05D 1/0088* (2013.01); *B62D 15/0255* (2013.01); *G05D 2201/0213* (2013.01)

(58) Field of Classification Search
CPC ......... G05D 1/0088; G05D 2201/0213; B62D 15/0255
See application file for complete search history.

(56) References Cited

U.S. PATENT DOCUMENTS

| 9,096,267 | B2* | 8/2015 | Mudalige | B62D 15/025 |
| 2012/0245833 | A1* | 9/2012 | Zaitsu | G08G 1/163 |
| | | | | 701/117 |
| 2014/0074356 | A1* | 3/2014 | Bone | G08G 1/167 |
| | | | | 701/41 |
| 2014/0195093 | A1* | 7/2014 | Litkouhi | B62D 15/0255 |
| | | | | 701/23 |
| 2017/0372610 | A1* | 12/2017 | Pflug | B60W 10/04 |

FOREIGN PATENT DOCUMENTS

JP   2011123840 A   6/2011
WO   2012/160591 A1   11/2012

* cited by examiner

*Primary Examiner* — Thomas Ingram
(74) *Attorney, Agent, or Firm* — Dinsmore & Shohl LLP

(57) ABSTRACT

An autonomous driving system includes: an information acquisition device that acquires surrounding situation information indicating a surrounding situation around a vehicle; and a lane change control device that controls lane change of the vehicle. An influence degree represents influence of the lane change on traffic flow around the vehicle. The lane change control device performs: acceptable range setting processing that sets an acceptable upper limit of the influence degree as a function of a position along a travel lane in which the vehicle travels; influence degree calculation processing that calculates the influence degree based on the surrounding situation information; and lane change determination processing that prohibits the lane change when the influence degree is greater than the acceptable upper limit while executes the lane change when the influence degree is equal to or less than the acceptable upper limit.

11 Claims, 17 Drawing Sheets

AUTONOMOUS DRIVING SYSTEM

CROSS-REFERENCE TO RELATED APPLICATIONS

This application claims priority to Japanese Patent Application No. 2016-236913, tiled on Dec. 6, 2016, the entire contents of which are hereby incorporated by reference.

BACKGROUND

Technical Field

The present disclosure relates to an autonomous driving technique for a vehicle. In particular, the present disclosure relates to lane change control in autonomous driving.

Background Art

Patent Literature 1 discloses a system for controlling lane change in an autonomous driving vehicle. When trying to make a lane change, the system checks a situation of a surrounding vehicle. More specifically, the system checks whether or not any surrounding vehicle close to the subject vehicle exists in a target lane of the lane change. If a surrounding vehicle exists nearby in the target lane, the system does not execute the lane change.

Patent Literature 2 discloses a lane change assist system for reducing driver's stress at a time of lane change. The lane change assist system provides the driver with an appropriate lane change option according to a situation of a surrounding vehicle.

LIST OF RELATED ART

Patent Literature 1: U.S. Pat. No. 9,096,267
Patent Literature 2: International Publication WO 2012/160591

SUMMARY

According to the autonomous driving technique disclosed in the above-mentioned Patent Literature 1, whether or not to execute the lane change is determined based on the situation of the surrounding vehicle. However, the lane change control based on the situation of the surrounding vehicle still has room for improvement.

As an example, let us consider a case of making a lane change to a left lane in order to make a left turn at an intersection ahead. At a position where there is still a margin (distance) to the intersection, there is no need to forcibly execute the lane change. However, at a position where there is little margin to the intersection, a human driver will try the lane change even if it is somewhat aggressive. For example, even when the left lane is congested, a human driver will try to cut into the left lane. That is to say, a human driver flexibly executes a lane change in consideration of not only the situation of the surrounding vehicle but also a position of the subject vehicle. However, according to the above-mentioned Patent Literature 1, when a surrounding vehicle exists nearby in the target lane, the lane change is not executed even at the position where there is little margin to the intersection. Such the lane change control appears strange from a human's point of view.

As another example, let us consider a vehicle cornering in a curve section of a road. If a wheel steering angle is changed during cornering, a turning radius changes, load transfer occurs, and steering characteristics change, which is not preferable in terms of vehicle stability. Therefore, a human driver will not unnecessarily execute a lane change in the curve section. A human driver will try a lane change preferably in a straight section. That is to say, a human driver flexibly executes a lane change in consideration of not only the situation of the surrounding vehicle but also a position of the subject vehicle. However, according to the above-mentioned Patent Literature 1, when no surrounding vehicle exists nearby in the target lane, the lane change is executed even in the curve section. Such the lane change control appears strange from a human's point of view.

In view of the above, the lane change control based on the situation of the surrounding vehicle has room for improvement. An object of the present disclosure is to provide a technique that can achieve a further flexible lane change in the autonomous driving.

A first aspect provides an autonomous driving system mounted on a vehicle.

The autonomous driving system includes:
an information acquisition device configured to acquire surrounding situation information indicating a situation around the vehicle; and
a lane change control device configured to control lane change of the vehicle.

An influence degree represents influence of the lane change on traffic flow around the vehicle.

The lane change control device performs:
acceptable range setting processing that sets an acceptable upper limit of the influence degree as a function of a position along a travel lane in which the vehicle travels;
influence degree calculation processing that calculates the influence degree based on the surrounding situation information; and
lane change determination processing that prohibits the lane change when the influence degree is greater than the acceptable upper limit while executes the lane change when the influence degree is equal to or less than the acceptable upper limit.

A second aspect further has the following features in addition to the first aspect.

The lane change control device further determines a zone in the travel lane where the lane change is to be made.

In the acceptable range setting processing, the lane change control device sets the acceptable upper limit in the zone.

The lane change control device performs the influence degree calculation processing and the lane change determination processing when the vehicle is traveling in the zone.

A third aspect further has the following features in addition to the second aspect.

The zone includes a first position and a second position that is closer to an end point of the zone than the first position is.

In the acceptable range setting processing, the lane change control device sets the acceptable upper limit at the second position to be larger than the acceptable upper limit at the first position.

A fourth aspect further has the following features in addition to the second aspect.

In the acceptable range setting processing, the lane change control device sets the acceptable upper limit to become larger from a start point towards an end point of the zone.

A fifth aspect further has the following features in addition to the second aspect.

In the acceptable range setting processing, the lane change control device divides the zone into a plurality of sub-zones and sets the acceptable upper limit individually for each of the plurality of sub-zones.

A sixth aspect further has the following features in addition to the second aspect.

In the acceptable range setting processing, the lane change control device decreases the acceptable upper limit at a midway position between a start point and an end point of the zone.

A seventh aspect further has the following features in addition to the sixth aspect.

If the lane change is not executed before the midway position, the lane change control device queries a driver of the vehicle for intention.

An eighth aspect further has the following features in addition to the first aspect.

The travel lane includes a straight section and a curve section.

In the acceptable range setting processing, the lane change control device sets the acceptable upper limit in the curve section to be smaller than the acceptable upper limit in the straight section.

A ninth aspect further has the following features in addition to the first aspect.

When a preceding vehicle slower than the vehicle exists in the travel lane, the lane change control device sets the acceptable upper limit after the vehicle catches up to the preceding vehicle to be smaller than the acceptable upper limit before the vehicle catches up to the preceding vehicle.

A tenth aspect further has the following features in addition to any one of the first to ninth aspects.

In the influence degree calculation processing, the lane change control device calculates the influence degree based on a degree of deceleration that is expected to occur in a surrounding vehicle when the lane change is executed.

According to the present disclosure, in determining whether or not to execute the lane change during the autonomous driving, a comparison is made between the influence degree and the acceptable upper limit. The influence degree is a parameter that depends on the situation around the vehicle. On the other hand, the acceptable upper limit is a parameter that does not depend on the situation around the vehicle but on the position along the travel lane in which the vehicle travels. Therefore, by comparing the influence degree and the acceptable upper limit, it is possible to consider not only the situation around the vehicle but also the position where the vehicle is located. It is thus possible to achieve a further flexible automatic lane change as compared with the conventional technique.

EMBODIMENTS

Embodiments of the present disclosure will be described below with reference to the attached drawings.

1. Outline

Figure 1:
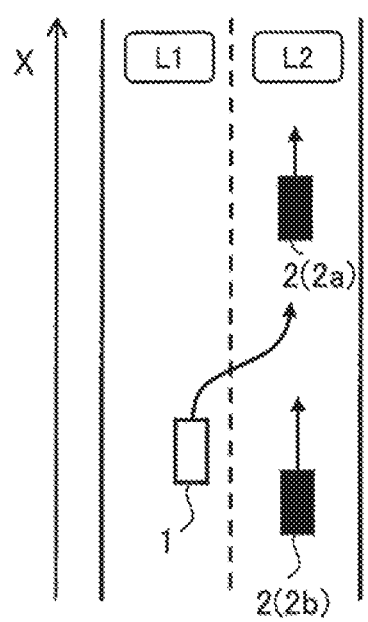
FIG. 1 is a conceptual diagram for explaining lane change of a vehicle.

FIG. 1 is a conceptual diagram for explaining lane change of a vehicle 1. The vehicle 1 is traveling in a travel lane L1. The vehicle 1 makes a lane change to a target lane 12 adjacent to the travel lane L1. Surrounding vehicles 2 (2a, 2b) exist in the target lane 12. The surrounding vehicle 2a precedes the vehicle 1, and the surrounding vehicle 2b is positioned behind the vehicle 1. The vehicle 1 makes a lane change to the target lane L2 to cut into a space between the surrounding vehicles 2a and 2b.

The lane change of the vehicle 1 influences traffic flow around the vehicle 1. For example, when the vehicle 1 executes the lane change to the target lane L2, the following surrounding vehicle 2b decelerates in order to avoid collision and secure an inter-vehicle distance. That is, the lane change of the vehicle 1 forces the surrounding vehicle 2b to decelerate, which is a typical example of influence of the lane change on the surrounding traffic flow. A degree of the influence of the lane change of the vehicle 1 on the surrounding traffic flow is hereinafter referred to as au "influence degree INF".

An autonomous driving system according to the present embodiment is mounted on the vehicle 1 and controls autonomous driving of the vehicle 1. Let us consider a case where the autonomous driving system automatically makes a lane change of the vehicle 1 as shown in FIG. 1. In this case, the autonomous driving system calculates the influence degree INF due to the lane change. For example, a degree of deceleration (e.g. a deceleration or a brake amount) that is expected to occur in the following surrounding vehicle 2b when the lane change is executed is used as the influence degree INF. The degree of deceleration can be estimated based on a relative position and a relative speed of the vehicle 1 and the surrounding vehicle 2b.

In the present embodiment, the influence degree INF described above is considered in order to determine whether or not to execute the lane change. It should be noted, however, that the influence degree INF is not merely compared with a constant threshold value. According to the present embodiment, a parameter that depends on a position X along the travel lane L1 is newly introduced in order to achieve a further flexible lane change. More specifically, an "acceptable upper limit LMT of the influence degree INF" is defined as a function of the position X along the travel lane L1.

Figure 2:
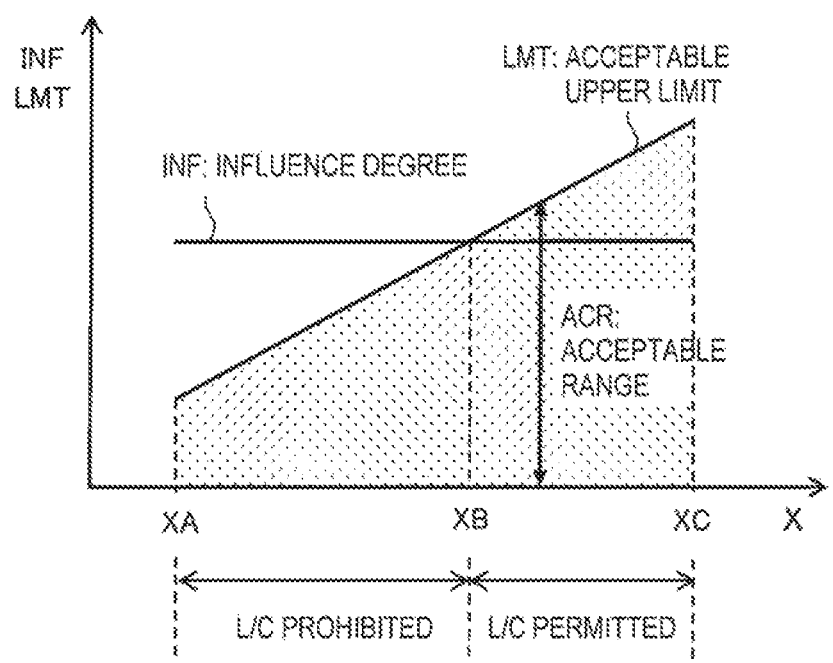
FIG. 2 is a conceptual diagram for explaining an outline of an autonomous driving system according to an embodiment of the present disclosure.

FIG. 2 is a conceptual diagram for explaining an outline of the autonomous driving system according to the present embodiment. In the present embodiment, an acceptable range ACR of the influence degree INF in which lane change is permitted is set. That is, when the influence degree INF is within the acceptable range ACR, the lane change is permitted. On the other hand, when the influence degree INF is beyond the acceptable range ACR, the lane change is prohibited. An upper limit of the acceptable range ACR is the acceptable upper limit LMT of the influence degree INF.

In the present embodiment, the acceptable upper limit LMT (the acceptable range ACR) is not a constant but a variable that depends on the position X. In other words, the autonomous driving system according to the present embodiment sets the acceptable upper limit LMT as a function of the position X along the travel lane L1. Meanwhile, the autonomous driving system calculates the above-described influence degree INF from moment to moment based on a situation around the vehicle 1. Then, the autonomous driving system compares the calculated influence degree INF with the acceptable upper limit LMT. When the influence degree INF is greater than the acceptable upper limit LMT, the autonomous driving system prohibits the lane change, namely, does not execute the lane change. On the other hand, when the influence degree INF is equal to or less than the acceptable upper limit LMT, the autonomous driving system permits the lane change and executes the lane change.

In the example shown in FIG. 2, the acceptable upper limit LMT is set so as to increase as the vehicle 1 moves forward. Therefore, even when the influence degree INF is constant without change, a magnitude relationship between the acceptable upper limit LMT and the influence degree INF can change. More specifically, the influence degree INF is greater than the acceptable upper limit LMT in a section between a position XA and a position XB. On the other hand, the influence degree INF is equal to or less than the acceptable upper limit LMT in a section between the position XB and a position XC. Therefore, the autonomous driving system does not execute the lane change until the vehicle 1 reaches the position XB and starts the lane change when the vehicle 1 reaches the position XB. Even when the influence degree INF is constant, a result of determination by the autonomous driving system varies depending on the position X of the vehicle 1.

As described above, according to the present embodiment, in determining whether or not to execute the lane change during the autonomous driving, a comparison is made between the "influence degree INF" and the "acceptable upper limit LMT". The influence degree INF is a parameter that depends on the situation around the vehicle 1. On the other hand, the acceptable upper limit LMT is a parameter that does not depend on the situation around the vehicle 1 but on the position X along the travel lane L1. Therefore, by comparing the influence degree INF and the acceptable upper limit LMT, it is possible to consider not only the situation around the vehicle 1 but also the position X where the vehicle 1 is located. It is thus possible to achieve a further flexible automatic lane change as compared with the conventional technique.

The concept of the present embodiment can be applied to various situations. Hereinafter, various setting patterns of the acceptable upper limit LMT (acceptable range ACR) according to the situation will be described.

2. Various Setting Patterns of Acceptable Upper Limit LMT

2-1. First Setting Pattern

Figure 3:
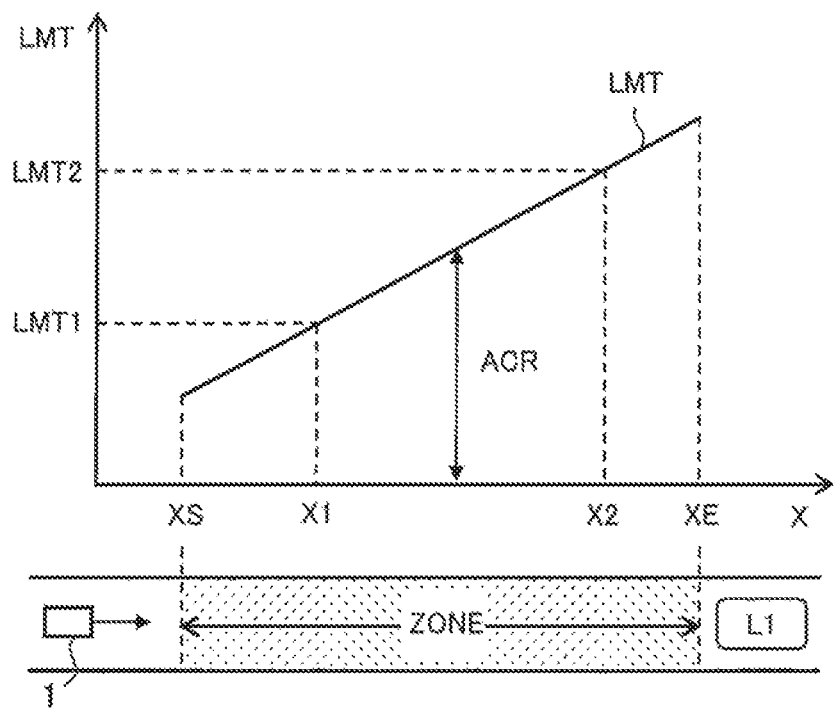
FIG. 3 is a conceptual diagram showing an example of a setting pattern of an acceptable upper limit of an influence degree according to the embodiment of the present disclosure.

FIG. 3 is a conceptual diagram showing a first setting pattern of the acceptable upper limit LMT. The first setting pattern is useful for lane change in a "zone". The "zone", which is a part of the travel lane L1, is a range where the vehicle 1 should make a lane change. For example, in a case of lane merging, a merge zone corresponds to the zone. As another example, in a case of lane change for avoiding an obstacle ahead in the travel lane L1, a certain section before the obstacle corresponds to the zone. The autonomous driving system performs processing (lane planning) that judges whether or not it is necessary to make a lane change. When judging that it is necessary to make a lane change, the autonomous driving system determines the zone.

In the example shown in FIG. 3, the acceptable upper limit LMT is set to become larger from a start point XS towards an end point XE of the zone. In the case of such setting, the following lane change control by the autonomous driving system is expected.

That is, at a position X close to the start point XS of the zone, the acceptable upper limit LMT is relatively small, and thus lane change is not executed when the influence degree INF is large. This means that when there is still a margin (distance) to the end point XE of the zone, the autonomous driving system does not forcibly execute a lane change as long as it disturbs the surrounding traffic flow. As the vehicle 1 becomes closer to the end point XE while not making a lane change, the acceptable upper limit LMT becomes larger and larger. Therefore, a probability of executing a lane change even when the influence degree INF is large increases. This means that when there is little margin to the end point XE of the zone, the autonomous driving system executes a lane change even if it disturbs the surrounding traffic flow.

Such the lane change operation is similar to a lane change operation by a human during manual driving. That is to say, by setting the acceptable upper limit LMT as a function of the position X as shown in FIG. 3, it is possible to reproduce a flexible lane change as a human does. In this manner, the autonomous driving system according to the present embodiment can achieve the automatic lane change with less sense of strangeness for the human and more consistent with the human senses. The fact that the automatic lane change consistent with the human senses is achieved contributes to increase in confidence in the autonomous driving system.

Figure 4:
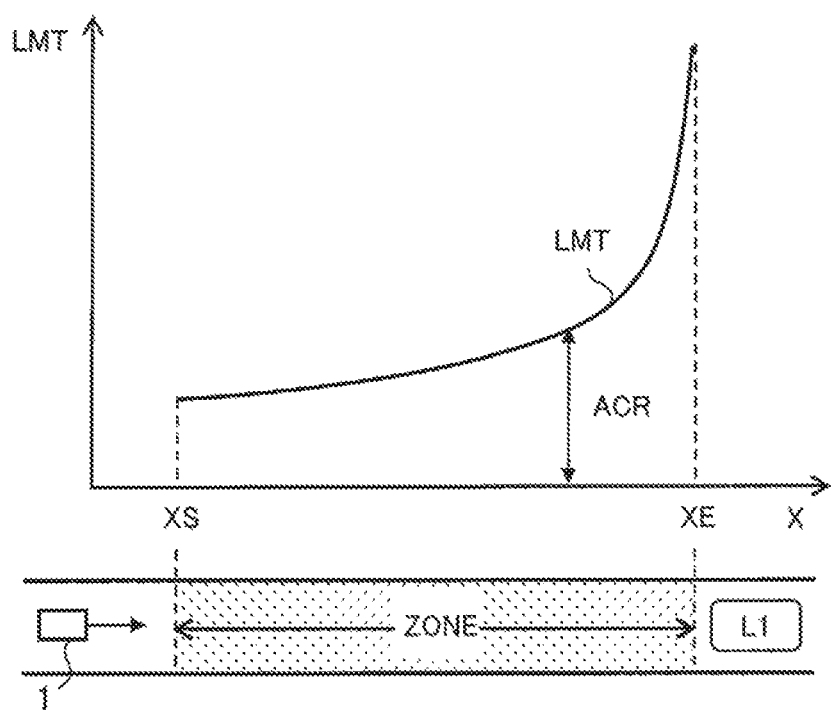
FIG. 4 is a conceptual diagram showing another example of the setting pattern of the acceptable upper limit of the influence degree according to the embodiment of the present disclosure.

It should be noted that the setting pattern of the acceptable upper limit LMT is not limited to that shown in FIG. 3. The acceptable upper limit LMT may rapidly increase in the vicinity of the end point XE as shown in FIG. 4. If it is desired to surely execute the lane change within the zone, the acceptable upper limit LMT may be set to infinite in the vicinity of the end point XE.

It is not necessary that the acceptable upper limit LMT monotonically increases over the entire section from the start point XS to the end point XE. For example, the zone may include a position where the acceptable upper limit LMT decreases. As a rough trend, it is sufficient that the acceptable upper limit LMT is set to be relatively small at a position close to the start point XS while relatively large at a position close to the aid point XE.

To be more general, referring to FIG. 3, the zone includes a first position X1 close to the start point XS and a second position X2 that is closer to the end point XE than the first position X1 is. The acceptable upper limit LMT2 at the second position X2 is set to be larger than the acceptable upper limit LMT1 at the first position X1. As a result, it is possible to achieve the automatic lane change with less sense of strangeness for the human and more consistent with the human senses.

2-2. Second Setting Pattern

Figure 5:
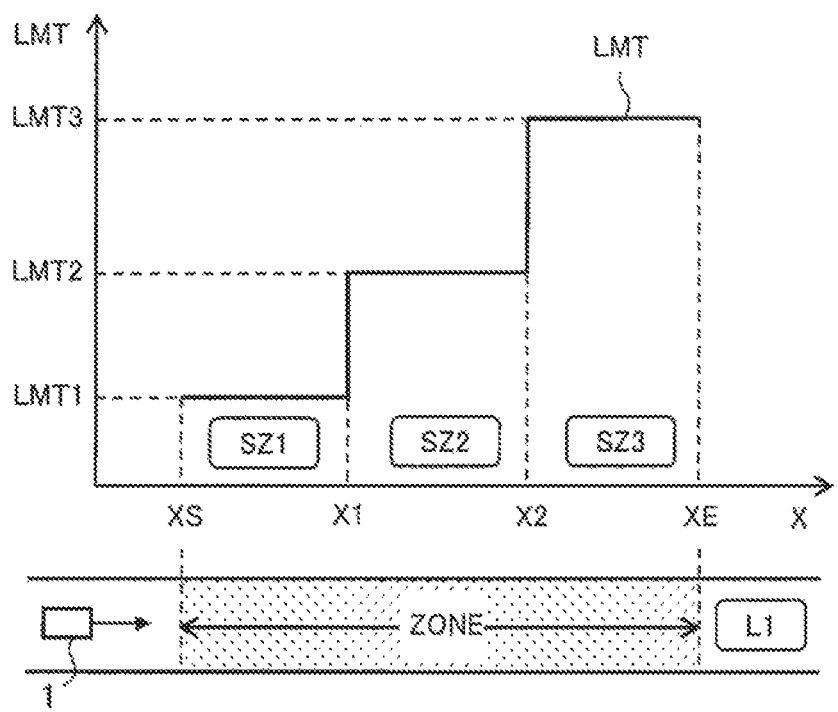
FIG. 5 is a conceptual diagram showing still another example of the setting pattern of the acceptable upper limit of the influence degree according to the embodiment of the present disclosure.

FIG. 5 is a conceptual diagram showing a second setting pattern of the acceptable upper limit LMT. In the second setting pattern, the zone is divided into a plurality of sub-zones. Moreover, the acceptable upper limit LMT is set individually for each of the plurality of sub-zones.

In the example shown in FIG. 5, the zone is divided into three sub-zones SZ1, SZ2, and SZ3. The acceptable upper limit LMT in the sub-zone SZ1 from the start point XS to a position X1 is set to a constant LMT1. The acceptable upper limit LMT in the sub-zone SZ2 from the position X1 to a position X2 is set to a constant LMT2 larger than the constant LMT1. The acceptable upper limit LMT in the sub-zone SZ3 from the position X2 to the end point XE is set to a constant LMT3 that is further larger than the constant LMT2. In this case, only three kinds LMT1, LMT2, and LMT3 are used as the acceptable upper limit LMT to be compared with the influence degree INF. Therefore, the comparison processing is simplified and thus computation load is reduced.

Moreover, in the example shown in FIG. 5, the acceptable upper limit LMT in each of the sub-zones SZ1, SZ2, and SZ3 is a constant being very simple. However, when viewed over the zone as a whole, the acceptable upper limit LMT is defined as a complicated function of the position X.

Figure 6:
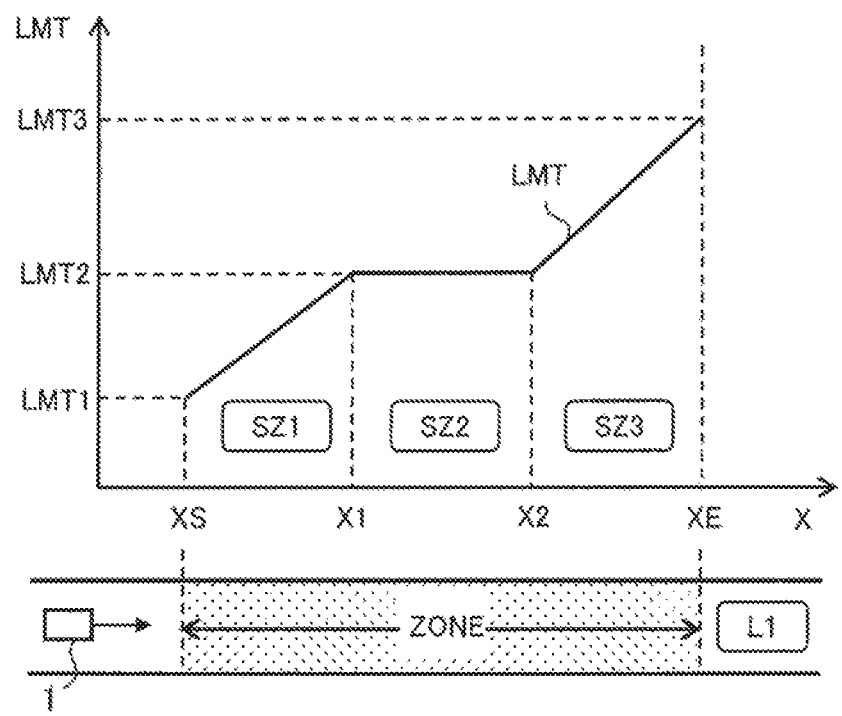
FIG. 6 is a conceptual diagram showing still another example of the setting pattern of the acceptable upper limit of the influence degree according to the embodiment of the present disclosure.

FIG. 6 shows another example. In FIG. 6, the acceptable upper limit LMT in each of the sub-zones SZ1 and SZ3 is represented by a simple linear expression, and the acceptable upper limit LMT in the sub-zone SZ2 is represented by a constant. Also in this case, the acceptable upper limit LMT having a complicated pattern is defined when viewed over the zone as a whole, although the definition of the acceptable upper limit LMT in each sub-zone is simple.

As described above, according to the second setting pattern, the zone is divided into a plurality of sub-zones. The acceptable upper limit LMT is set individually for each of the plurality of sub-zones. As a result, it is possible to achieve a complicated setting pattern in the zone as a whole, even when the acceptable upper limit LMT in each sub-zone is simple. In other words, it is possible to easily design a wide variety of setting patterns.

2-3. Third Setting Pattern

Figure 7:
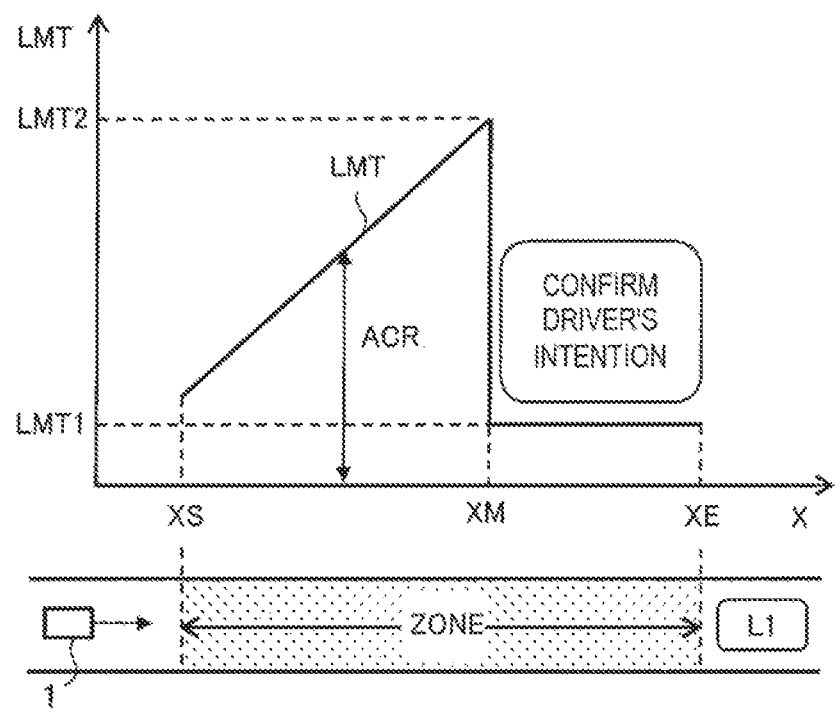
FIG. 7 is a conceptual diagram showing still another example of the setting pattern of the acceptable upper limit of the influence degree according to the embodiment of the present disclosure.

FIG. 7 is a conceptual diagram showing a third setting pattern of the acceptable upper limit LMT. In FIG. 7, a midway position XM is a position between the start point XS and the end point XE of the zone. In a section from the start point XS to the midway position XM, the acceptable upper limit LMT is set to be relatively large. For example, the acceptable upper limit LMT is set to become larger from the start point XS towards the midway position XM.

However, at the midway position XM, the acceptable upper limit LMT decreases at a stroke. In the example shown in FIG. 7, the acceptable upper limit LMT decreases from LMT2 to LMT1 at the midway position XM. Therefore, a possibility of the lane change becomes low after the midway position XM. Such the setting pattern of the acceptable upper limit LMT can be utilized as follows, for example.

For example, if the lane change cannot be executed before the midway position XM of the zone, the autonomous driving system confirms a driver's intention. The driver may desire to shift from the autonomous driving to manual driving. Alternatively, the driver may give up the lane change this time and desire resetting of a target route. Alternatively, the driver may strongly desire to execute the lane change by further increasing the acceptable upper limit LMT. The autonomous driving system refrains from executing the lane change until the driver makes a decision. For that purpose, the autonomous driving system not only queries the driver for intention but also decreases the acceptable upper limit LMT at the midway position XM.

As described above, according to the third setting pattern, it is possible to confirm the drivers intention when the lane change cannot be executed before the midway position of the zone. Accordingly, it is possible to achieve a further flexible lane change.

2-4. Fourth Setting Pattern

Figure 8:
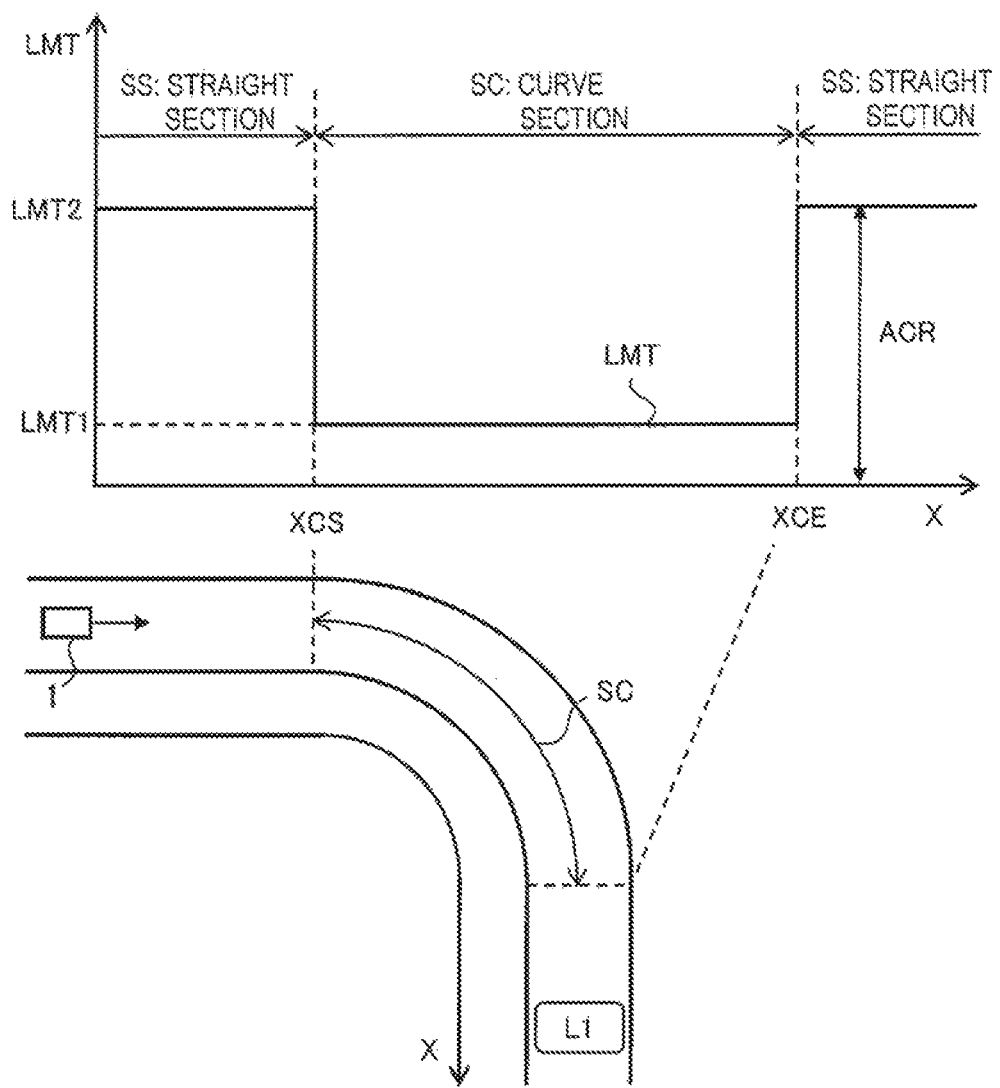
FIG. 8 is a conceptual diagram showing still another example of the setting pattern of the acceptable upper limit of the influence degree according to the embodiment of the present disclosure.

FIG. 8 is a conceptual diagram showing a fourth setting pattern of the acceptable upper limit LMT, The fourth setting pattern is useful for a lane change in a road including a curve. As shown in FIG. 8, the travel lane L1 includes a straight section SS and a curve section SC. The curve section SC is a section from a start point XCS to an end point XCE.

The vehicle 1 corners in the curve section SC. If the vehicle 1 makes a lane change in the curve section SC, the vehicle 1 needs to further turn its wheels. However, when a wheel steering angle is changed during cornering, a turning radius changes, load transfer occurs, and steering characteristics change, which is not preferable in terms of vehicle stability Therefore, a human driver will not unnecessarily execute a lane change in the curve section SC. A human driver will try a lane change preferably in the straight section SS.

In order to achieve a lane change consistent with such the human senses, the acceptable upper limit LMT in the curve section SC is set to be smaller than the acceptable upper limit LMT in the straight section SS. As a result, the lane change is less likely to be executed in the curve section SC, and the lane change is more likely to be executed in the straight section SS.

In the example shown in FIG. 8, the acceptable upper limit LMT in the straight section SS is act to a constant LMT2. The acceptable upper limit LMT in the curve section SC is set to a constant LMT1 which is smaller than the constant LMT2. The constant LMT1 may be a negative value. In that case, the lane change is not executed in the curve section SC even when the influence degree INF is zero.

2-5. Fifth Setting Pattern

Figure 9:
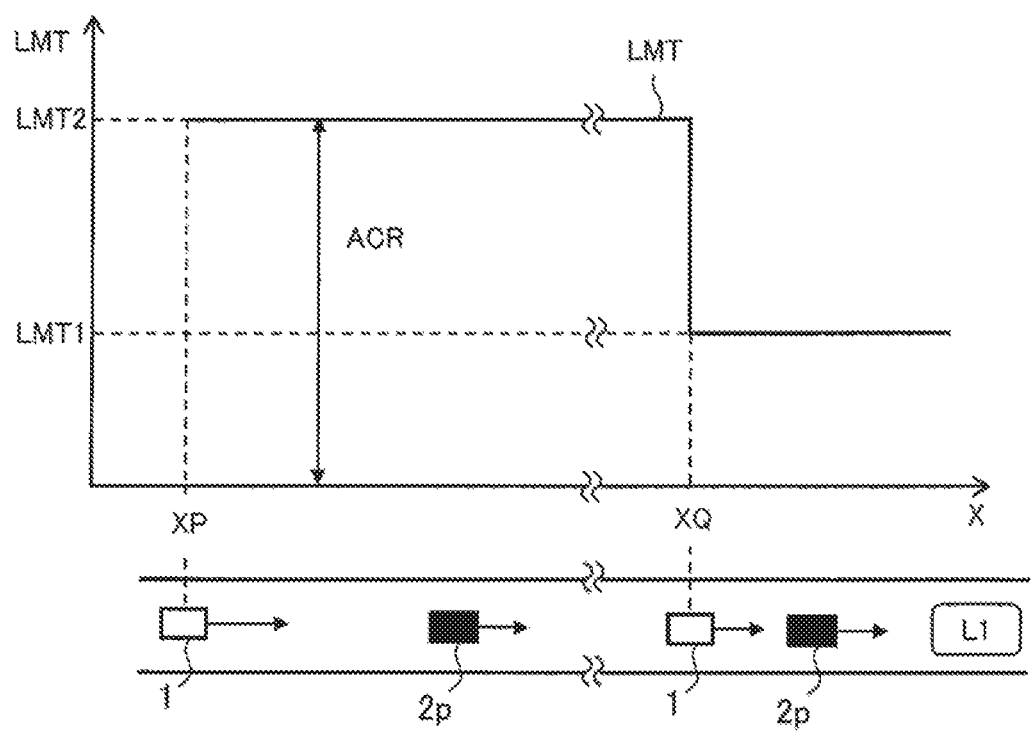
FIG. 9 is a conceptual diagram showing still another example of the setting pattern of the acceptable upper limit of the influence degree according to the embodiment of the present disclosure.

FIG. 9 is a conceptual diagram showing a fifth setting pattern of the acceptable upper limit LMT. The fifth setting pattern is useful for a lane change for overtaking.

As shown in FIG. 9, a preceding vehicle 2p slower than the vehicle 1 exists ahead of the vehicle 1 in the travel lane L1. At a position XP, the autonomous driving system of the vehicle 1 finds (recognizes) the slow preceding vehicle 2p and plans a lane change for overtaking the preceding vehicle 2p. In this case, in order to quickly execute the lane change, the autonomous driving system sets the acceptable upper limit LMT to be a relatively large value LMT2.

However, when a target lane adjacent to the travel lane L1 is congested, the lane change is not executed easily. Then, the vehicle 1 may catch up to the preceding vehicle 2p without being able to execute the lane change. In that case, the autonomous driving system performs deceleration control to make the vehicle 1 follow-up the preceding vehicle 2p. In the case of the follow-up traveling, there is no need to forcibly execute a lane change while affecting the surrounding traffic flow. Therefore, the autonomous driving system decreases the acceptable upper limit LMT to suppress the unnecessary lane change. In the example shown in FIG. 9, at a position XQ, the vehicle 1 catches up to the preceding vehicle 2p. Then, the autonomous driving system decreases the acceptable upper limit LMT from LMT2 to LMT1.

Whether or not the vehicle 1 catches up to the preceding vehicle 2p can be determined, for example, based on an inter-vehicle distance between the vehicle 1 and the preceding vehicle 2p. When the inter-vehicle distance is equal or greater than a threshold value, the vehicle 1 does not yet catch up to the preceding vehicle 2p. In this case, the autonomous driving system sets the acceptable upper limit LMT to be relatively large. When the inter-vehicle distance becomes less than the threshold value, if means that the vehicle 1 has caught up to the preceding vehicle 2p. In this case, the autonomous driving system decreases the acceptable upper limit LMT.

As described above, according to the fifth setting pattern, the acceptable upper limit LMT after the vehicle 1 catches up to the preceding vehicle 2p is set to be smaller than the acceptable upper limit LMT before the vehicle 1 catches up to the preceding vehicle 2p. As a result, the lane change is promoted until the vehicle 1 catches up to the preceding vehicle 2p, and the lane change is suppressed after the vehicle 1 catches up to the preceding vehicle 2p. In this manner, flexible lane change control can be achieved in the case of overtaking.

2-6. Sixth Setting Pattern

Figure 10:
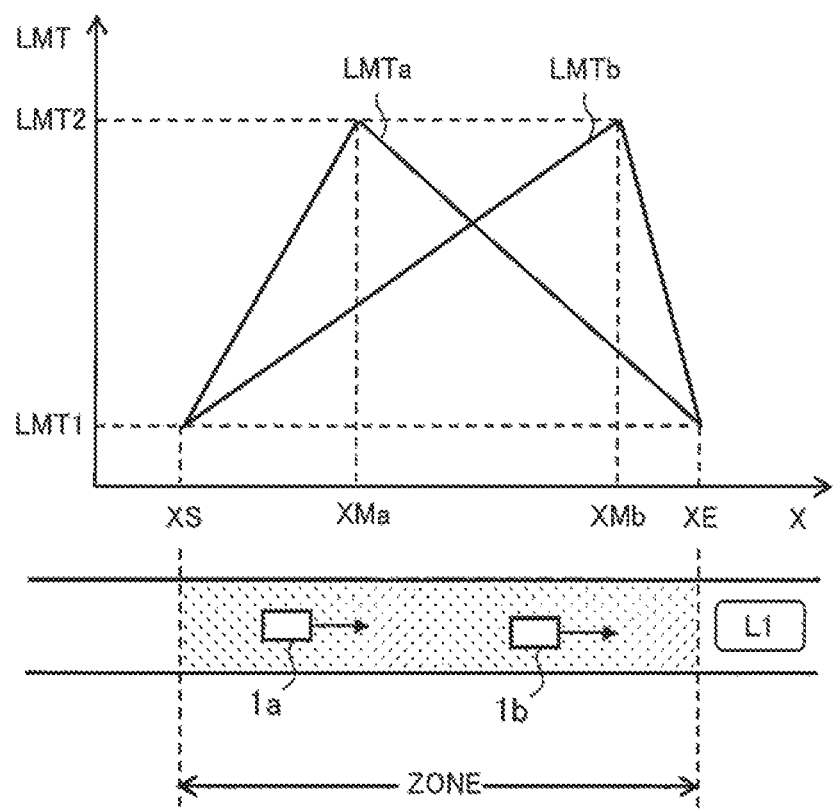
FIG. 10 is a conceptual diagram showing still another example of the setting pattern of the acceptable upper limit of the influence degree according to the embodiment of the present disclosure.

FIG. 10 is a conceptual diagram showing a sixth setting pattern of the acceptable upper limit LMT. The sixth setting pattern is useful for a case where a plurality of vehicles 1 respectively make lane changes in the same zone.

As an example, let us consider a case shown in FIG. 10 where vehicles 1a and 1b make lane changes in the some zone. The vehicles 1a and 1b each is provided with the autonomous driving system according to the present embodiment. If the setting patterns of the acceptable upper limit LMT for the vehicles 1a and 1b are the same, the vehicles 1a and 1b execute lane changes at similar positions X in the zone. For example, in the case of the setting pattern shown in FIG. 3, both the vehicles 1a and 1b are likely to execute the lane changes in the vicinity of the end point XE of the zone. However, when the lane changes concentrate in the same position, the traffic flow is greatly disturbed, which is not preferable.

In order to solve such the problem, a peak position at which the acceptable upper limit LMT takes the maximum is made different among the plurality of vehicles 1. For example, by randomly setting the peak position of the acceptable upper limit LMT in each of the plurality of vehicles 1, the peak positions can be dispersed. Since the peak positions of the acceptable upper limit LMT are dispersed in the zone, the lane changes are prevented from concentrating in the same position.

In the example shown in FIG. 10, the setting patterns of the acceptable upper limit LMT for the vehicles 1a and 1b are represented by LMTa and LMTb, respectively. A peak position XMa of the setting pattern LMTa is different from a peak position XMb of the setting pattern LMTb. That is, the peak positions of the acceptable upper limit LMT are dispersed in the zone. As a result the vehicle 1a and the vehicle 1b are prevented from executing the lane changes at similar positions.

It should be noted that it is possible to combine arbitrary some of the first to sixth setting patterns described above, as long as they are not contradictory to each other.

Hereinafter, the autonomous driving system according to the present embodiment will be described in more detail.

3. Configuration Example of Autonomous Driving System

Figure 11:
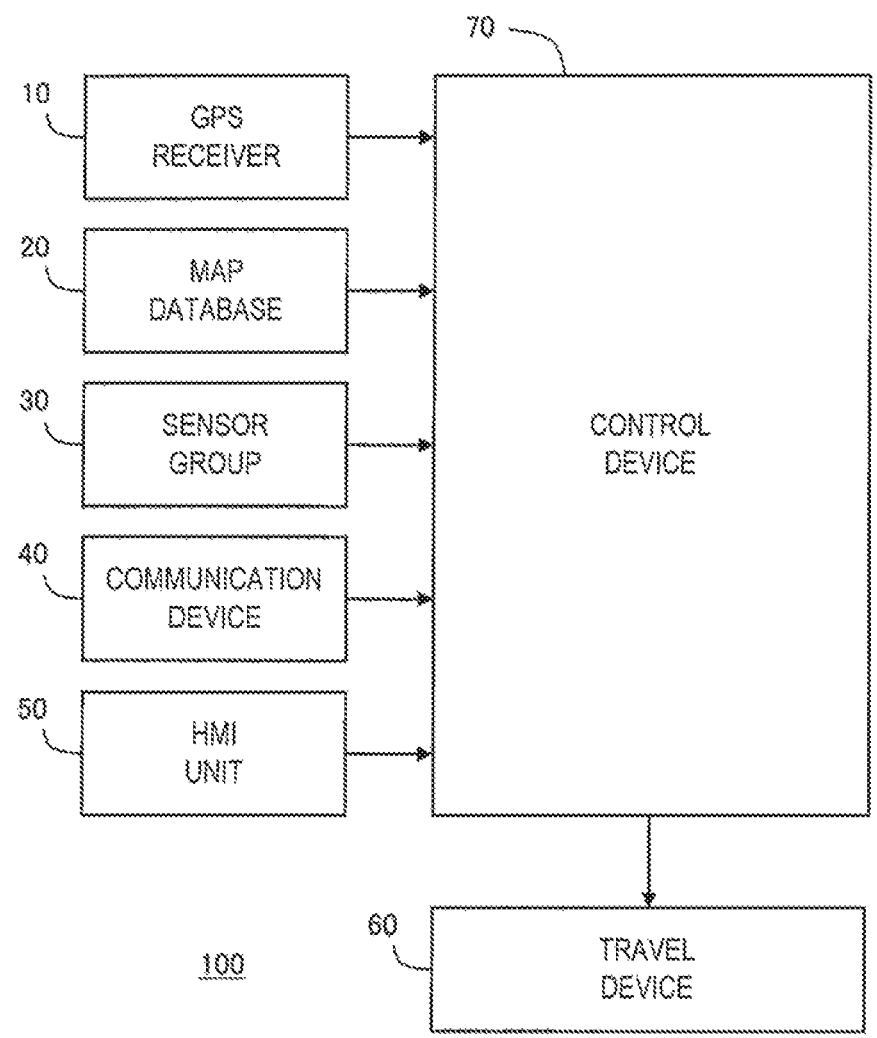
FIG. 11 is a block diagram showing a configuration example of the autonomous driving system according to the embodiment of the present disclosure.

FIG. 11 is a block diagram showing a configuration example of an autonomous driving system 100 according to the present embodiment. The autonomous driving system 100 is mounted on the vehicle 1 and controls the autonomous driving of the vehicle 1. More specifically, the autonomous driving system 100 is provided with a GPS (Global Positioning System) receiver 10, a map database 20, a sensor group 30, a communication device 40, an HMI (Human Machine Interface) unit 50, a travel device 60, and a control device 70.

The GPS receiver 10 receives signals transmitted from a plurality of GPS satellites and calculates a position and a posture (i.e. orientation) of the vehicle 1 based on the received signals. The GPS receiver 10 sends the calculated information to the control device 70.

Information indicating a boundary position of each lane on a map is beforehand recorded in the map database 20. The boundary position of each lane is represented by a group of plural points (i.e. a point group). Alternatively, the boundary position of each lane may be represented by a group of plural lines (i.e. a line group). The map database 20 is stored in a predetermined storage device.

The sensor group 30 detects a situation around the vehicle 1 and a travel state of the vehicle 1. The sensor group 30 is exemplified by a LIDAR (Laser Imaging Detection and Ranging), a radar, a camera, a vehicle speed sensor, and the like. The LIDAR uses laser lights to detect a target around the vehicle 1. The radar uses radio waves to detect a target around the vehicle 1. The camera images a situation around the vehicle 1. The vehicle speed sensor detects a speed of the vehicle 1. The sensor group 30 sends the detected information to the control device 70.

The communication device 40 performs a V2X communication (i.e. a vehicle-to-vehicle communication and a vehicle-to-infrastructure communication). More specifically, the communication device 40 performs a V2V communication (a vehicle-to-vehicle communication) with another vehicle. In addition, the communication device 40 performs a V2I communication (a vehicle-to-infrastructure communication) with a surrounding infrastructure. Through the V2X communication, the communication device 40 can acquire information on an environment around the vehicle 1. The communication device 40 sends the acquired information to the control device 70.

The HMI (Human Machine Interface) unit 50 is an interface for proving a driver with information and receiving information from the driver. For example, the HMI unit 50 includes an input device, a display device, a speaker, and a microphone. The input device is exemplified by a touch panel, a keyboard, a switch, and a button. By using the input device, the driver can input information to the HMI unit 50. The HMI unit 50 sends the information input by the driver to the control device 70.

The travel device 60 includes a steering device, a driving device, a braking device, a transmission, and so forth. The steering device turns wheels. The driving device is a power source that generates a driving force. The driving device is exemplified by an engine and an electric motor. The braking device generates a braking force.

Figure 12:
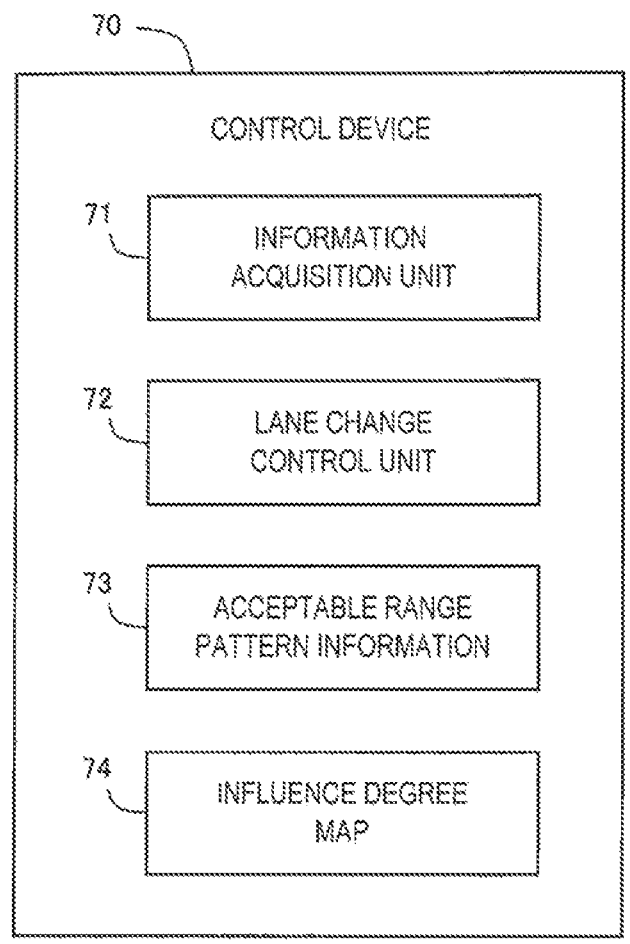
FIG. 12 is a block diagram showing a functional configuration example of a control device of the autonomous driving system according to the embodiment of the present disclosure.

The control device 70 performs autonomous driving control that controls the autonomous driving of the vehicle 1. Typically, the control device 70 is a microcomputer including a processor, a memory, and an input/output interface. The control device 70 is also called an ECU (Electronic Control Unit). The control device 70 receives a variety of information through the input/output interface. The control device 70 performs the autonomous driving control based on the received information. More specifically, the control device 70 creates a travel plan of the vehicle 1 and controls the travel device 60 so that the vehicle 1 travels according to the travel plan FIG. 12 is a block diagram showing a functional configuration example of the control device 70 according to the present embodiment. In the present embodiment, we particularly consider "lane change control" among the autonomous driving control by the control device 70. The control device 70 includes an information acquisition unit 71 and a lane change control unit 72 as functional blocks relating to the lane change control. These functional blocks are achieved by the processor of the control device 70 executing a control program stored in the memory. The control program may be recorded on a computer-readable recording medium.

The information acquisition unit 71 performs "information acquisition processing" that acquires information necessary for the lane change control. The lane change control unit 72 performs "lane change control processing" that controls lane change of the vehicle 1. In the lane change control processing, the lane change control unit 72 refers to acceptable range pattern information 73 and an influence degree map 74. The acceptable range pattern information 73 and the influence degree map 74 are stored in the memory of the control device 70.

Hereinafter, each of the information acquisition processing and the lane change control processing in the present embodiment will be described in detail.

4. Information Acquisition Processing

Figure 13:
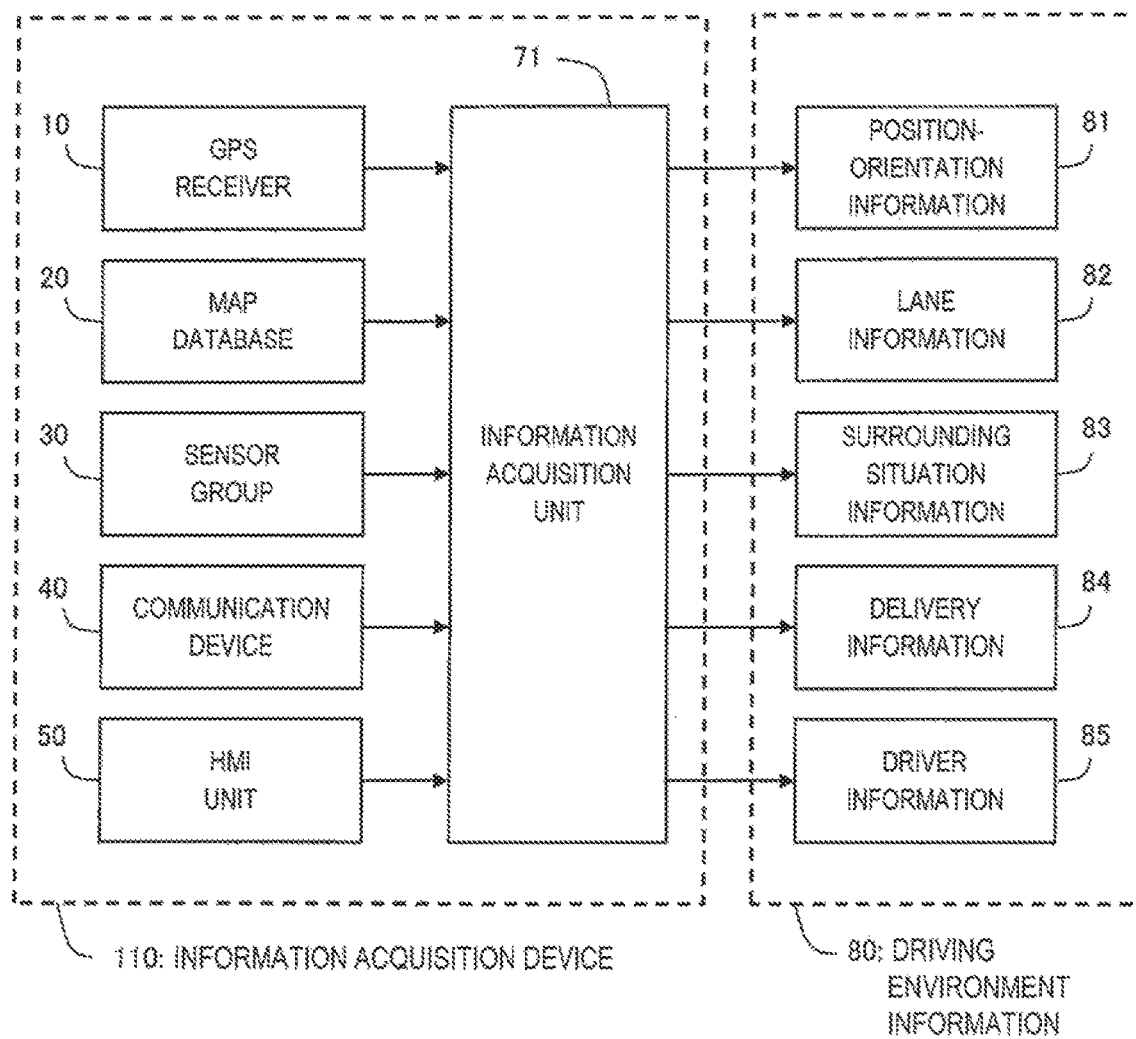
FIG. 13 is a block diagram for explaining information acquisition processing by the autonomous driving system according to the embodiment of the present disclosure.

FIG. 13 is a block diagram for explaining the information acquisition processing according to the present embodiment. In the information acquisition processing, the information acquisition unit 71 acquires information necessary for the lane change control. The information acquisition processing is repeatedly executed every certain cycle.

More specifically, the information acquisition unit 71 acquires, from the GPS receiver 10, position-orientation information 81 indicating a current position and a posture (i.e. orientation) of the vehicle 1.

Moreover, the information acquisition unit 71 reads the information regarding lanes from the map database 20 to generate lane information 82. The lane information 82 includes a geometry (i.e. position, shape, and orientation) of each lane on a map. Based on the lane information 82, the information acquisition unit 71 can recognize lane merging, lane branching, lane intersecting, and the like. Besides, the information acquisition unit 71 can also calculate a lane curvature, a lane width, and the like based on the lane information 82.

Moreover, the information acquisition unit 71 acquires surrounding situation information 83. The surrounding situation information 83 is information indicating a situation around the vehicle 1. For example, the information acquisition unit 71 recognizes a target around the vehicle 1 based on the position-orientation information 81, the lane information 82, and the detected information received from the sensor group 30. The target around the vehicle 1 includes a moving target and a stationary target. The moving target is exemplified by the surrounding vehicle 2 (see FIG. 1), a motorbike, a bicycle, a pedestrian, and so forth. Information regarding a moving target includes a position, a speed, and a size of the moving target. The stationary target is exemplified by a fallen object, a roadside structure, a white line, a traffic sign, and the like. Information regarding a stationary target includes a position and a size of the stationary target.

In particular, the surrounding situation information 83 includes surrounding vehicle information regarding the surrounding vehicle 2. The surrounding vehicle information includes the number of surrounding vehicles 2, a relative position of each surrounding vehicle 2, a relative speed of each surrounding vehicle 2, and so forth. In addition, the information acquisition unit 71 may utilize the V2V communication by the communication device 40 to directly acquire traveling information of the surrounding vehicle 2. For example, the traveling information of the surrounding vehicle 2 includes a speed, an acceleration, a deceleration, and the like. Such the traveling information of the surrounding vehicle 2 also is included in the surrounding vehicle information.

Moreover, the information acquisition unit 71 receives delivery information 84 through communication by the communication device 40. The delivery information 84 is information delivered from infrastructure, the surrounding vehicle 2, and the like. Such the delivery information 84 is exemplified by roadwork section information, accident information, traffic regulation information, and so forth.

Moreover, the information acquisition unit 71 receives driver information 85 through the HMI unit 50. The driver information 85 includes a variety of settings selected by the driver. The driver can beforehand register the driver information 85 in the autonomous driving system 100 by using the input device of the HMI unit 50.

All of the position-orientation information 81, the lane information 82, the surrounding situation information 83, the delivery information 84, and the driver information 85 as exemplified above indicate driving environment for the vehicle 1. Information indicating the driving environment for the vehicle 1 is hereinafter referred to as "driving environment information 80". That is to say, the driving environment information 80 includes the position-orientation information 81, the lane information 82, the surrounding situation information 83, the delivery information 84, and the driver information 85.

It can be said that the information acquisition unit 71 of the control device 70 has a function of acquiring the driving environment information 80. As shown in FIG. 13, the information acquisition unit 71 together with the GPS receiver 10, the map database 20, the sensor group 30, the communication device 40, and the HMI unit 50 constitute an "information acquisition device 110". The information acquisition device 110 as a part of the autonomous driving system 100 performs the information acquisition processing described above.

5. Lane Change Control Processing

Figure 14:
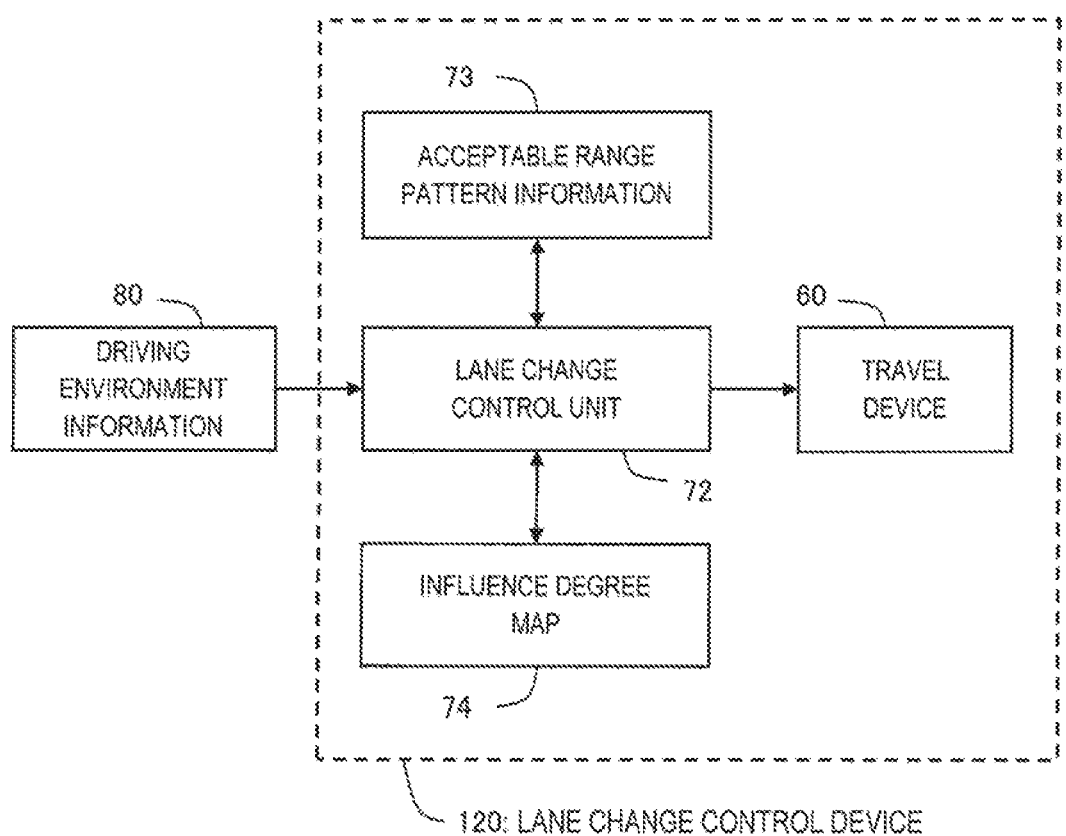
FIG. 14 is a block diagram for explaining lane change control processing by the autonomous driving system according to the embodiment of the present disclosure.
Figure 15:
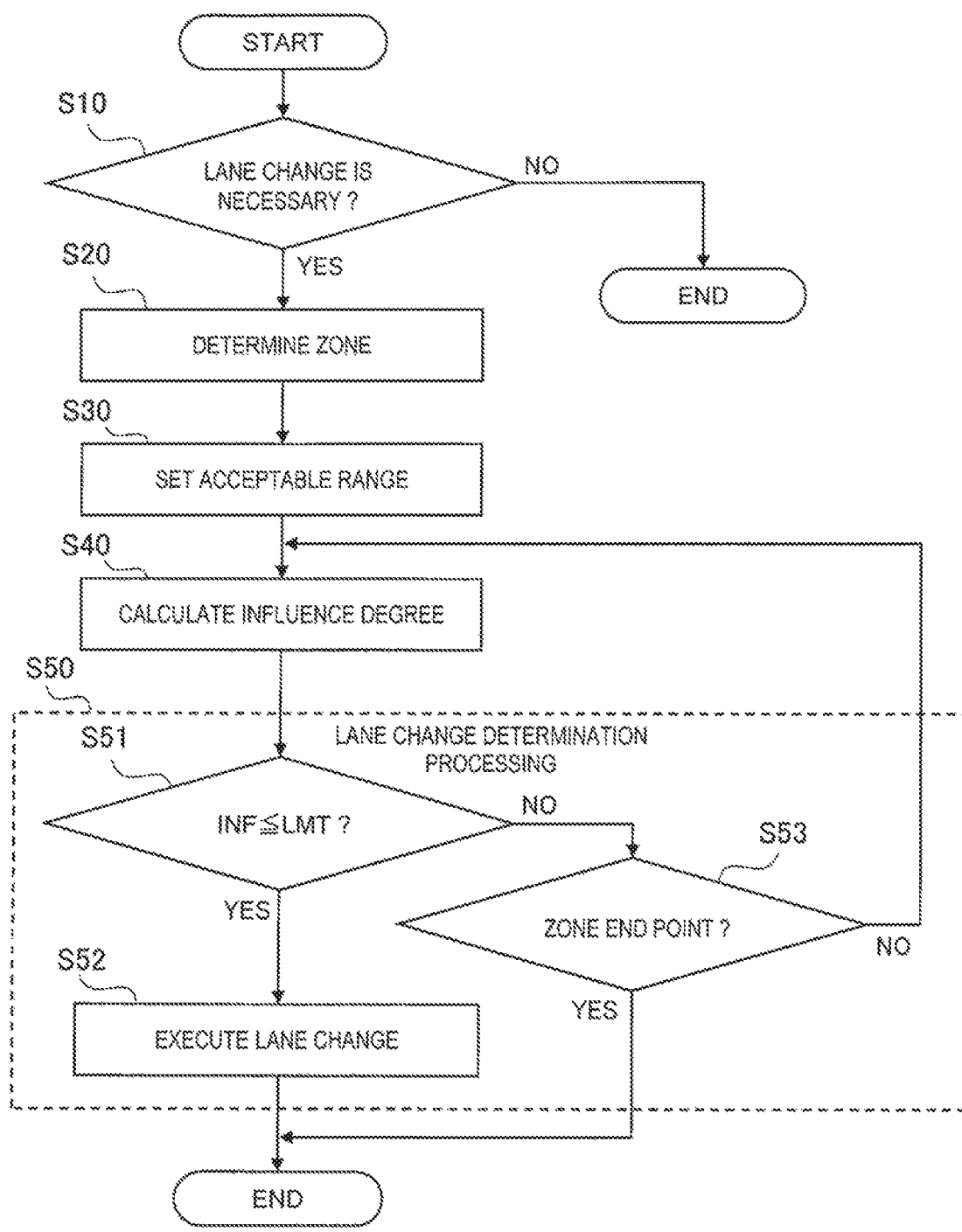
FIG. 15 is a flow chart showing the lane change control processing according to the embodiment of the present disclosure.

Based on the above-described driving environment information 80, the lane change control unit 72 performs the lane change control processing that controls lane change of the vehicle 1. FIG. 14 is a block diagram for explaining the lane change control processing. FIG. 15 is a flow chart tor explaining the lane change control processing. The lane change control processing according to the present embodiment will be described with reference to FIGS. 14 and 15.

5-1. Step S10

First, the lane change control unit 72 determines, based on the driving environment information 80, whether or not it is necessary to make a lane change (this process corresponds to a part of lane planning).

For example, based on the position-orientation information 81 and the lane information 82, the lane change control unit 72 recognizes that merging in front of the vehicle 1. In this case, the lane change control unit 72 decides to make a lane change for the lane merging.

As another example, based on the surrounding situation information 83, the lane change control unit 72 recognizes an obstacle or a low-speed vehicle (see the preceding vehicle 2p in FIG. 9) in front of the vehicle 1. The obstacle is exemplified by a fallen object, a stopped vehicle, and so forth. In this case, the lane change control unit 72 decides to make a lane change in order to avoid the obstacle or overtake the low-speed vehicle.

As still another example, based on the position-orientation information 81 and the delivery information 84, the lane change control unit 72 recognizes a road work section or an accident vehicle in front of the vehicle 1. In this case, the lane change control unit 72 decides to make a lane change in order to avoid the roadwork section or the accident vehicle.

If there is no need to make a lane change (Step S10; No), the lane change control processing ends. On the other hand, if it is decided to make a lane change (Step S10; Yes), the processing proceeds to Step S20.

5-2. Step S20

The lane change control unit 72 determines a zone (see FIG. 3 and so forth) in the travel lane L1 where the lane change is to be made. For example, in the case of the lane merging, a merge zone corresponds to the zone. As another example, in a case of making a lane change to a left lane in order to make a left turn at an intersection ahead, a certain section before a reference point before the intersection is the zone. As still another example, in the case of the lane change for avoiding an obstacle or a roadwork section ahead, a certain section before the obstacle or the roadwork section is the zone.

The lane change control unit 72 can determine the zone by referring to the driving environment information 80 used in the above-described Step S10. After the zone is determined, the processing proceeds to Step S30.

It should be noted that no zone is required in some cases. For example, the lane change for overtaking as shown in FIG. 9 does not necessarily have to succeed. Therefore, it is not necessarily required to set a zone for overtaking. When there is no need to set a zone, the lane change control unit 72 skips Step S20.

5-3. Step S30

The lane change control unit 72 performs "acceptable range setting processing". More specifically, the lane change control unit 72 sets the acceptable upper limit LMT (i.e. the acceptable range ACR) as a function of the position X along the travel lane L1. In the case where the zone is determined in the above-described Step S20, the lane change control unit 72 sets the acceptable upper limit LMT in the zone.

Various kinds as exemplified in FIGS. 3 to 10 can be considered as the setting pattern of the acceptable upper limit LMT. For example, the setting patterns shown in FIGS. 3 to 7, and 10 are ones useful for a situation where there is a zone. The setting pattern shown in FIG. 8 is one useful for a situation where there is a curve (i.e. a curve section SC) ahead. The setting pattern shown in FIG. 9 is one useful for a situation where there is a slow preceding vehicle 2p ahead.

Acceptable range pattern information 73 is information that specifies the setting pattern of the acceptable upper limit LMT with respect to each situation. For example, the acceptable range pattern information 73 specifies any of the setting patterns shown in FIGS. 3 to 7, and 10 with respect to a situation where there is a zone. Moreover, the acceptable range pattern information 73 specifies the setting pattern shown in FIG. 8 with respect to a situation where there is a curve (i.e. a curve section SC) ahead. Moreover, the acceptable range pattern information 73 specifies the setting pattern shown in FIG. 9 with respect to a situation where there is a slow preceding vehicle 2p ahead.

Such the acceptable range pattern information 73 is stored in the memory of the control device 70 in advance. The lane change control unit 72 refers to the acceptable range pattern information 73 to acquire the setting pattern of the acceptable upper limit LMT appropriate to the situation. Then, the lane change control unit 72 sets the acceptable upper limit LMT in accordance with the acquired setting pattern.

It should be noted that the driver can edit the acceptable range pattern information 73 (i.e. the setting pattern of the acceptable upper limit LMT) by using the input device of the HMI unit 50. It is thereby possible to reflect the driver's preference in the acceptable range pattern information 73. For example, when there are a plurality of candidates for a setting pattern with respect to a certain situation, the driver can select a preferred candidate from the plurality of candidates.

5-4. Step S40

The lane change control unit 72 performs "influence degree calculation processing". More specifically, the lane change control unit 72 calculates, based on the surrounding situation information 83, the influence degree INF every predetermined cycle. In the case where the zone is determined in the above-described Step S20, the lane change control unit 72 performs the influence degree calculation processing when the vehicle 1 is traveling in the zone.

The influence degree INF is a degree of influence of the lane change of the vehicle 1 on the surrounding traffic flow. For example, let us consider a degree of deceleration (e.g. a deceleration or a brake amount) that is expected to occur in a following surrounding vehicle 2b (see FIG. 1) when the lane change of the vehicle 1 is executed. It can be said that as the degree of deceleration increases, the influence of the lane change of the vehicle 1 becomes larger. Therefore, the lane change control unit 72 can calculate the influence degree INF based on the degree of deceleration. The influence degree INF is calculated to be larger as the degree of deceleration increases.

As another example, as the number of surrounding vehicles 2 within a certain range from the vehicle 1 becomes larger, the influence of the lane change on the surrounding traffic flow becomes larger. Therefore, the lane change control unit 72 may calculate the influence degree INF in consideration of the number of surrounding vehicles 2.

The degree of deceleration in a surrounding vehicle 2b can be estimated based on a relative position and a relative speed of the vehicle 1 and the surrounding vehicle 2b. The relative position and the relative speed are included in the surrounding situation information 83. Moreover, the number of surrounding vehicles 2 also is included in the surrounding situation information 83. Therefore, the lane change control unit 72 can calculate the influence degree INF by reference to the surrounding situation information 83.

An influence degree map 74 may be used in calculating the influence degree INF. The influence degree map 74 indicates a correspondence relationship between an input parameter and the influence degree INF. For example, the input parameter includes the relative position and the relative speed of the vehicle 1 and the surrounding vehicle 2b. The input parameter may further include the number of the surrounding vehicles 2. Such the influence degree map 74 is beforehand created and stored in the memory of the control device 70. The lane change control unit 72 can calculate the influence degree INF based on the surrounding situation information 83 and the influence degree map 74.

5-5. Step S50

The lane change control unit 72 performs "lane change determination processing". In the case where the zone is determined in the above-described Step S20, the lane change control unit 72 performs the lane change determination processing when the vehicle 1 is traveling in the zone.

More specifically, the lane change control unit 72 recognizes, based on the position-orientation information 81 and the lane information 82, a current position of the vehicle 1 in the travel lane L1. Then, the lane change control unit 72 compares the influence degree INF calculated in Step S40 with the acceptable upper limit LMT at the current position (Step S51).

When the influence degree INF is equal to or less than the acceptable upper limit LMT (Step S51; Yes), the lane change control unit 72 permits the lane change and executes the lane change (Step S52). In the lane change, the lane change control unit 72 actuates the travel device 60 as appropriate to change a traveling direction of vehicle 1.

On the other hand, when the influence degree INF is greater than the acceptable upper limit LMT (Step S51; No), the lane change control unit 72 prohibits the lane change, namely, does not execute the lane change. In this case, the processing proceeds to Step S53.

In Step S53, the lane change control unit 72 determines, based on the position-orientation information 81 and the lane information 82, whether or not the vehicle 1 has reached the end point XE of the zone. When the vehicle 1 has not yet reached the end point XE of the zone (Step S53; No), the processing returns to Step S40 and the lane change control unit 72 calculates the latest influence degree INF. On the other hand, when the vehicle 1 has reached the end point XE of the zone (Step S53; Yes), the lane change control unit 72 gives up the lane change and terminates the lane change control processing.

5-6. Case of Third Setting Pattern Shown in FIG. 7

Figure 16:
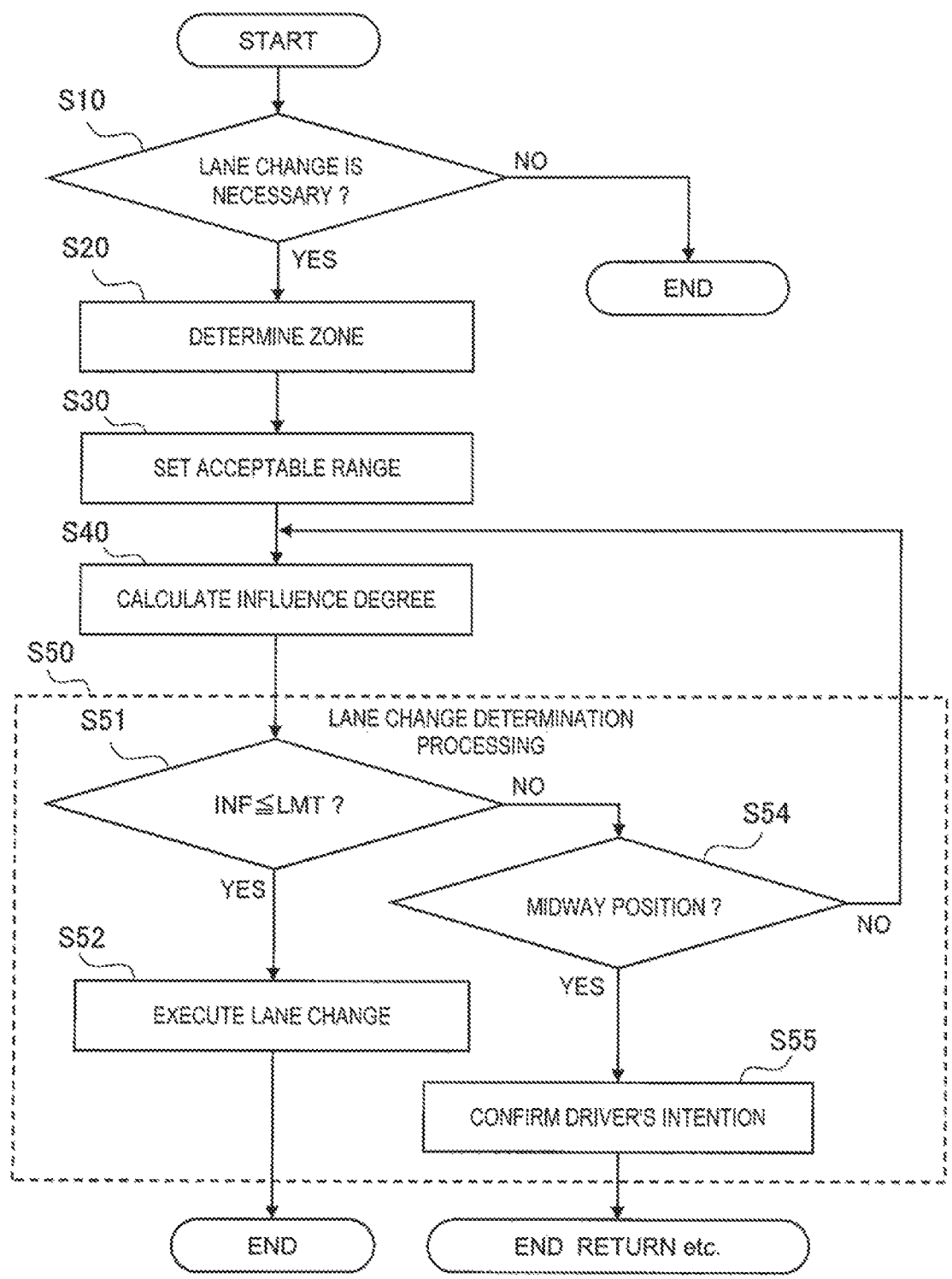
FIG. 16 is a flow chart showing a modification example of the lane change control processing according to the embodiment of the present disclosure.

FIG. 16 is a flow chart showing the lane change control processing in the case of the third setting pattern shown in FIG. 7. Steps S10 to S40 are the same as in the case shown in FIG. 15. In Step S30, the lane change control unit 72 sets the acceptable upper limit LMT in accordance with the third setting pattern shown in FIG. 7. More specifically, the lane change control unit 72 decreases the acceptable upper limit LMT at the midway position XM between the start point XS and the end point XE of the zone.

A part of Step S50 is different from the case shown in FIG. 15. More specifically, when the influence degree INF is greater than the acceptable upper limit LMT (Step S51; No), the processing proceeds to Step S54.

In Step S54, the lane change control unit 72 determines, based on the position-orientation information 81 and the lane information 82, whether or not the vehicle 1 has reached the midway position XM (see FIG. 7). When the vehicle 1 has not yet reached the midway position XM (Step S54; No), the processing returns to Step S40 and the lane change control unit 72 calculates the latest influence degree INF. On the other hand, when the vehicle 1 has reached the midway position XM (Step S54; Yes), it means that the lane change has not been executed before the midway position XM. In this case, the processing proceeds to Step S55.

In Step S55, the lane change control unit 72 performs driver's intention confirmation processing. More specifically, the lane change control unit 72 queries the driver for intention through the display device or the speaker of the HMI unit 50.

When the lane change is not executed before the midway position XM, the driver may desire to shift from the autonomous driving to manual driving. Alternatively, the driver may give up the lane change this time and desire resetting of a target route. Alternatively, the driver may strongly desire to execute the lane change by further increasing the acceptable upper limit LMT. When the driver makes a decision, the driver uses the input device of the HMI unit 50 to input the decided intention. The lane change control unit 72 terminates or continues the lane change control in accordance with the intention input by the driver.

It should be noted that the lane change is refrained after the midway position XM because the acceptable upper limit LMT is set to be small. During this period of time, the driver can make 1 decision. In other words, since the acceptable upper limit LMT is decreased at the midway position XM, a time for the driver to make a decision is secured.

5-7. Case of Fifth Setting Pattern Shown in FIG. 9

Figure 17:
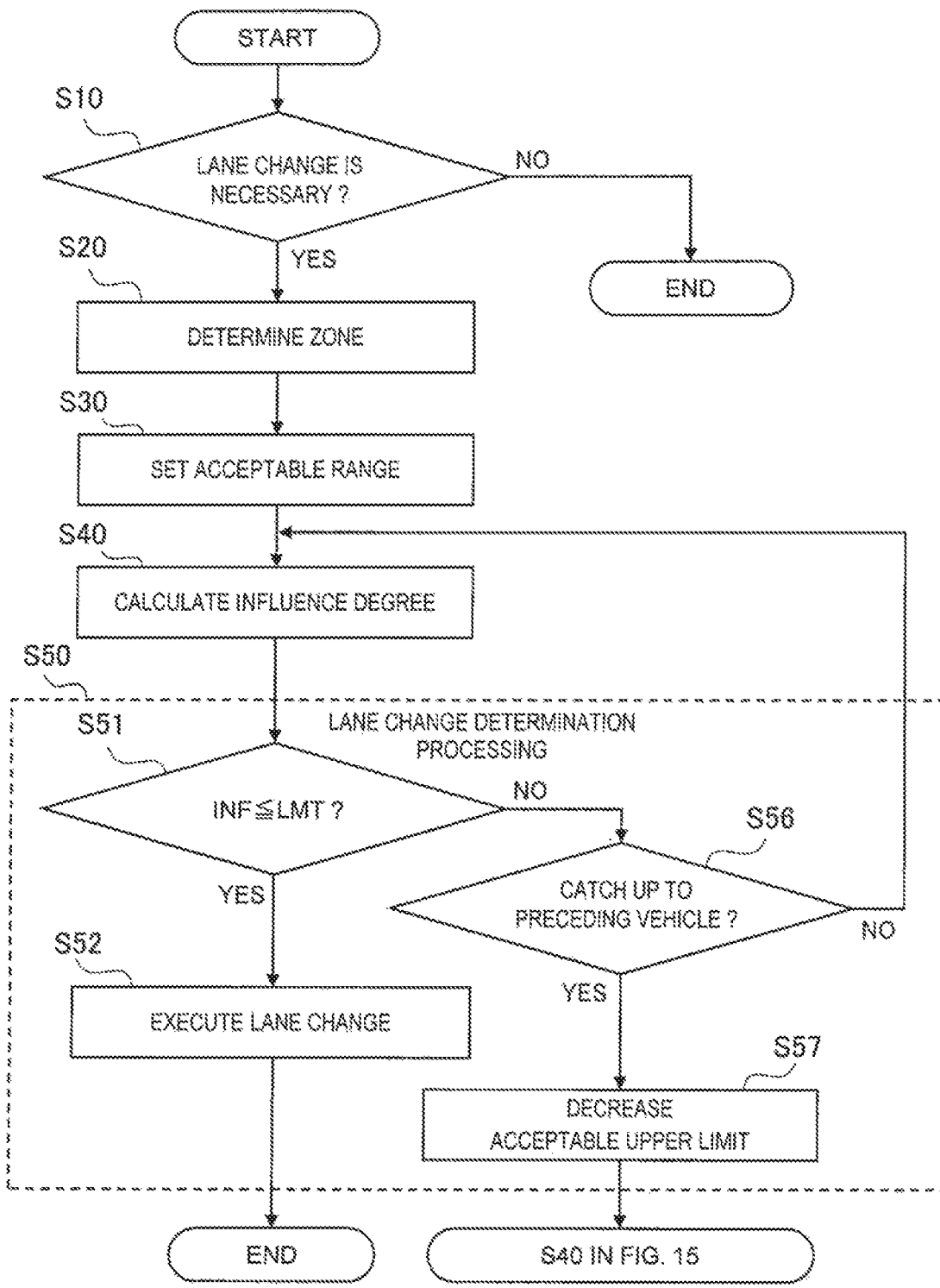
FIG. 17 is a flow chart showing another modification example of the lane change control processing according to the embodiment of the present disclosure.

FIG. 17 is a flow chart showing the lane change control processing in the case of the fifth setting pattern shown in FIG 9.

In Step S10, the lane change control unit 72 recognizes, based on the surrounding situation information 83, a slow-speed preceding vehicle 2p in front of vehicle 1 (see FIG. 9). In this case, the lane change control unit 72 decides to make a lane change for overtaking the preceding vehicle 2p (Step S10; Yes).

In Step S20, the lane change control unit 72 determines a zone. For example, a certain section in front of the position XP shown in FIG. 9 is set as the zone. It should be noted that the lane change for overtaking does not necessarily have to succeed. Therefore, Step S20 is not indispensable.

In Step S30, the lane change control unit 72 sets the acceptable upper limit LMT to be a relatively large value. As a result, quick lane change is promoted.

Step S40 is the same as in the case shown in FIG. 15. A part of Step S50 is different from the case shown in FIG. 15. More specifically, when the influence degree INF is greater than the acceptable upper limit LMT (Step S51; No), the processing proceeds to Step S56.

In Step S56, the lane change control unit 72 determines whether or not the vehicle 1 has caught up to the preceding vehicle 2p. For example, the lane change control unit 72 refers to the surrounding situation information 83 to monitor an inter-vehicle distance between the vehicle 1 and the preceding vehicle 2p. When the inter-vehicle distance is equal to or greater than the threshold value, the lane change control unit 72 determines that the vehicle 1 has not yet caught up to the preceding vehicle 2p (Step S56; No). In this case, the processing returns to Step S40 and the lane change control unit 72 calculates the latest influence degree INF.

On the other hand, when the inter-vehicle distance becomes less than the threshold value, the lane change control unit 72 determines that the vehicle 1 has caught up to the preceding vehicle 2p (Step S56; Yes). This corresponds to a case where the vehicle 1 has caught up to the preceding vehicle 2p without being able to execute the lane change. In this case, the processing proceeds to Step S57.

When the vehicle 1 catches up to the preceding vehicle 2p, the autonomous driving system 100 performs deceleration control to make the vehicle 1 follow-up the preceding vehicle 2p. In the case of the follow-up traveling, there is no need to forcibly execute a lane change while affecting the surrounding traffic flow. Therefore, the lane change control unit 72 decreases the acceptable upper limit LMT (Step S57). That is, the lane change control unit 72 sets the acceptable upper limit LMT after the vehicle 1 catches up to the preceding vehicle 2p to be smaller than the acceptable upper limit LMT before the vehicle 1 catches up to the preceding vehicle 2p.

After that, the processing proceeds to Step S40 in FIG. 15. Since the acceptable upper limit LMT is decreased, the lane change control unit 72 does not forcibly execute a lane change as long as it disturbs the surrounding traffic flow. The lane change control unit 72 executes a lane change at a timing when the influence degree INF is small.

5-8. Lane Change Control Device

As shown in FIG. 14, the lane change control unit 72, the acceptable range pattern information 73, the influence degree map 74, and the travel device 60 constitute a "lane change control device 120". The lane change control device 120 as a part of the autonomous driving system 100 performs the lane change control processing described above.

6. Summary

As described above, according to the present embodiment, in determining whether or not to execute the lane change during the autonomous driving, a comparison is made between the "influence degree INF" and the "acceptable upper limit LMT". The influence degree INF is a parameter that depends on the situation around the vehicle 1. On the other hand, the acceptable upper limit LMT is a parameter that does not depend on the situation around the vehicle 1 but on the position X along the travel lane L1. Therefore, by comparing the influence degree INF and the acceptable upper limit LMT, it is possible to consider not only the situation around the vehicle 1 but also the position X where the vehicle 1 is located. It is thus possible to achieve a further flexible automatic lane change as compared with the conventional technique. In particular, it is possible to achieve the automatic lane change with less sense of strangeness for the human and more consistent with the human senses, which contributes to increase in confidence in the autonomous driving system.

What is claimed is:

1. An autonomous driving system mounted on a vehicle, comprising:
   an information acquisition device configured to acquire surrounding situation information indicating a situation around the vehicle; and
   a lane change control device configured to control lane change of the vehicle,
   wherein an influence degree represents influence of the lane change on traffic flow around the vehicle,
   wherein the lane change control device performs:
   acceptable range setting processing that sets an acceptable upper limit of the influence degree as a function of a position along a travel lane in which the vehicle travels;
   influence degree calculation processing that calculates the influence degree based on the surrounding situation information; and
   lane change determination processing that prohibits the lane change when the influence degree is greater than the acceptable upper limit while executing the lane change when the influence degree is equal to or less than the acceptable upper limit.

2. The autonomous driving system according to claim 1, wherein the lane change control device further determines a zone in the travel lane where the lane change is to be made,
   wherein in the acceptable range setting processing, the lane change control device sets the acceptable upper limit in the zone, and
   wherein the lane change control device performs the influence degree calculation processing and the lane change determination processing when the vehicle is traveling in the zone.

3. The autonomous driving system according to claim 2, wherein the zone includes a first position and a second position that is closer to an end point of the zone than the first position is, and
   wherein in the acceptable range setting processing, the lane change control device sets the acceptable upper limit at the second position to be larger than the acceptable upper limit at the first position.

4. The autonomous driving system according to claim 2, wherein in the acceptable range setting processing, the lane change control device sets the acceptable upper limit to become larger from a start point towards an end point of the zone.

5. The autonomous driving system according to claim 2, wherein in the acceptable range setting processing, the lane change control device divides the zone into a plurality of sub-zones and sets the acceptable upper limit individually for each of the plurality of sub-zones.

6. The autonomous driving system according to claim 2, wherein in the acceptable range setting processing, the lane change control device decreases the acceptable upper limit at a midway position between a start point and an end point of the zone.

7. The autonomous driving system according to claim 6, wherein if the lane change is not executed before the midway position, the lane change control device queries a driver of the vehicle for intention.

8. The autonomous driving system according to claim 1, wherein the travel lane includes a straight section and a curve section, and
   wherein in the acceptable range setting processing, the lane change control device sets the acceptable upper limit in the curve section to be smaller than the acceptable upper limit in the straight section.

9. The autonomous driving system according to claim 1, wherein when a preceding vehicle slower than the vehicle exists in the travel lane, the lane change control device sets the acceptable upper limit after the vehicle catches up to the preceding vehicle to be smaller than the acceptable upper limit before the vehicle catches up to the preceding vehicle.

10. The autonomous driving system according to claim 1, wherein in the influence degree calculation processing, the lane change control device calculates the influence degree based on a degree of deceleration that is expected to occur in a surrounding vehicle when the lane change is executed.

11. The autonomous driving system according to claim 1, wherein the acceptable upper limit is independent of the traffic flow around the vehicle.

* * * * *

UNITED STATES PATENT AND TRADEMARK OFFICE
CERTIFICATE OF CORRECTION

PATENT NO. : 10,466,701 B2
APPLICATION NO. : 15/819645
DATED : November 5, 2019
INVENTOR(S) : Ryuta Hashimoto and Yoshinori Watanabe Page 1 of 1

It is certified that error appears in the above-identified patent and that said Letters Patent is hereby corrected as shown below:

In the Specification

In Column 1, Line 7, delete "tiled" and insert --filed--, therefor.
In Column 4, Line 53, delete "12" and insert --L2--, therefor.
In Column 4, Line 55, delete "12" and insert --L2--, therefor.
In Column 5, Line 2, delete "au" and insert --an--, therefor.
In Column 7, Line 19, delete "aid" and insert --end--, therefor.
In Column 8, Line 52, after "stability", insert --.--.
In Column 8, Line 64, delete "act" and insert --set--, therefor.
In Column 9, Line 39, delete "if" and insert --it--, therefor.
In Column 10, Line 19, after "As a result", insert --,--.
In Column 11, Line 31, after "plan", insert --.--.
In Column 13, Line 13, delete "tor" and insert --for--, therefor.
In Column 13, Line 37, delete "road work" and insert --roadwork--, therefor.
In Column 16, Line 38, delete "make 1 decision" and insert --make a decision--, therefor.

Signed and Sealed this
Eighteenth Day of February, 2020

Andrei Iancu
*Director of the United States Patent and Trademark Office*